(12) United States Patent
Ramaiyer et al.

(10) Patent No.: US 11,188,554 B2
(45) Date of Patent: Nov. 30, 2021

(54) SYSTEM AND METHOD FOR REAL TIME DATA AGGREGATION IN A VIRTUAL CUBE IN A MULTIDIMENSIONAL DATABASE ENVIRONMENT

(71) Applicant: ORACLE INTERNATIONAL CORPORATION, Redwood Shores, CA (US)

(72) Inventors: Kumar Ramaiyer, Cupertino, CA (US); Victor Belyaev, San Jose, CA (US); Alexey Roytman, Beer Sheva (IL); Natasha Reichman, Beer Sheva (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 11 days.

(21) Appl. No.: 16/374,402

(22) Filed: Apr. 3, 2019

(65) Prior Publication Data

US 2020/0026709 A1  Jan. 23, 2020

Related U.S. Application Data

(60) Provisional application No. 62/700,762, filed on Jul. 19, 2018.

(51) Int. Cl.
*G06F 7/00* (2006.01)
*G06F 17/00* (2019.01)
(Continued)

(52) U.S. Cl.
CPC ........ *G06F 16/254* (2019.01); *G06F 16/2455* (2019.01)

(58) Field of Classification Search
None
See application file for complete search history.

(56) References Cited

U.S. PATENT DOCUMENTS 5,574,952 A  11/1996  Brady
5,915,129 A   6/1999  Slivka
(Continued)

OTHER PUBLICATIONS

International Search Report and the Written Opinion of the International Searching Authority dated Jun. 28, 2019 for PCT Application No. PCT/US2019/027952, 10 pages.

(Continued)

*Primary Examiner* — Tuan A Pham
(74) *Attorney, Agent, or Firm* — Tucker Ellis LLP

(57) ABSTRACT

In accordance with an embodiment, described herein are systems and methods for real time data aggregation in a virtual cube in a multidimensional database, in accordance with an embodiment. A method can provide, at a computer that includes one or more microprocessors, a multidimensional database server executing on the computer, wherein the multidimensional database server supports at least one multidimensional cube, a data source associated with the multidimensional cube, and at least one source of real-time data accessible by the data source. The method can query, by the multidimensional cube, the data source, the query comprising an identification of the at least one source of real-time data. The method can provide, by the data source, on-demand access to the multidimensional cube to the at least one source of real-time data. The method can use targeted data from the at least one source of real-time data within the multidimensional cube without being stored therein.

20 Claims, 9 Drawing Sheets

(51) Int. Cl.
　　　*G06F 16/25*　　(2019.01)
　　　*G06F 16/2455*　(2019.01)

(56) References Cited

U.S. PATENT DOCUMENTS

| | | | |
|---|---|---|---|
| 6,161,105 | A | 12/2000 | Keighan |
| 6,574,720 | B1 | 6/2003 | Hopeman |
| 6,629,102 | B1 | 9/2003 | Malloy |
| 6,766,325 | B1 | 7/2004 | Pasumansky |
| 6,873,994 | B2 | 3/2005 | Kootale |
| 7,133,876 | B2 | 11/2006 | Roussopoulos |
| 7,392,242 | B1 | 6/2008 | Baccash |
| 8,099,383 | B2 * | 1/2012 | Naibo ............... G06Q 10/10 707/603 |
| 8,156,083 | B2 | 4/2012 | Banerjee |
| 8,386,296 | B2 | 2/2013 | Hage |
| 10,083,195 | B2 | 9/2018 | Zhou |
| 10,318,498 | B2 | 6/2019 | Tran |
| 10,346,435 | B2 | 7/2019 | Walker |
| 10,360,527 | B2 | 7/2019 | Abe |
| 10,467,251 | B2 | 11/2019 | Menon |
| 2002/0029207 | A1 * | 3/2002 | Bakalash ............. G06F 16/30 |
| 2003/0005420 | A1 | 1/2003 | Ghosh |
| 2004/0054858 | A1 | 3/2004 | Chandrasekaran |
| 2005/0262108 | A1 | 11/2005 | Gupta |
| 2006/0010159 | A1 | 1/2006 | Mirchandani |
| 2006/0085742 | A1 | 4/2006 | Harold |
| 2006/0106769 | A1 | 5/2006 | Gibbs |
| 2006/0271568 | A1 | 11/2006 | Balkir |
| 2007/0027674 | A1 | 2/2007 | Parson |
| 2007/0061344 | A1 | 3/2007 | Dickerman |
| 2007/0088691 | A1 | 4/2007 | Dickerman |
| 2007/0094668 | A1 | 4/2007 | Jacquot |
| 2008/0288524 | A1 | 11/2008 | Dumitru |
| 2008/0301086 | A1 * | 12/2008 | Gupta ............... G06F 16/283 |
| 2009/0030915 | A1 * | 1/2009 | Winter ............... G06F 16/283 |
| 2009/0248651 | A1 | 10/2009 | Perry |
| 2009/0249125 | A1 | 10/2009 | Bhatawdekar |
| 2009/0276705 | A1 | 11/2009 | Ozdemir |
| 2009/0327330 | A1 * | 12/2009 | Abouzied ......... G06F 16/2453 |
| 2011/0066590 | A1 | 3/2011 | Chang et al. |
| 2014/0046920 | A1 | 2/2014 | Shuma |
| 2014/0122413 | A1 | 5/2014 | Presti |
| 2016/0179921 | A1 * | 6/2016 | Gupta ............... G06F 16/275 707/601 |
| 2017/0032016 | A1 | 2/2017 | Zinner et al. |
| 2017/0116032 | A1 | 4/2017 | Tran |
| 2017/0116215 | A1 | 4/2017 | Ramaiyer |
| 2017/0116281 | A1 | 4/2017 | Roytman |
| 2017/0116290 | A1 | 4/2017 | Reichman |
| 2017/0116308 | A1 | 4/2017 | Alberg |
| 2017/0116309 | A1 | 4/2017 | Menon |
| 2017/0116310 | A1 | 4/2017 | Walker |
| 2017/0116311 | A1 | 4/2017 | Reichman |
| 2017/0116312 | A1 | 4/2017 | Reichman |
| 2017/0116313 | A1 | 4/2017 | Roytman |
| 2019/0073366 | A1 | 3/2019 | Raimaiyer |
| 2019/0079959 | A1 | 3/2019 | Raimaiyer |
| 2019/0102445 | A1 | 4/2019 | Raimaiyer |
| 2019/0102446 | A1 | 4/2019 | Raimaiyer |
| 2019/0102447 | A1 | 4/2019 | Raimaiyer |
| 2019/0258612 | A1 | 8/2019 | Tran |
| 2019/0286638 | A1 | 9/2019 | Walker |

OTHER PUBLICATIONS

Driscoll, James R. et al., "Making Data Structures Persistent", Journal of Computer and System Sciences, vol. 38, No. 1, Feb. 1989, Printed in Belgium, Copyright © 1989, 39 pages.

Oracle, EPM Information Development Team, Oracle® Integrated Operational Planning, Fusion Edition Release 4.0.1 Installation Guide, Copyright © 2001, 2009, 18 pages.

Dracle, EPM Information Development Team, Oracle® Integrated Operational Planning, Fusion Edition Release 4.0.1 User's Guide, Copyright © 2004, 2009, 272 pages.

Iankovszky, Andra et al., Edgewater Ranzal, Oracle Platinum Consulting Partner, "The Uncharted Territory Ready to be Discovered: Hybrid Essbase", Hyperion UKUOG, Jun. 18, 2015, 24 pages.

Russakovsky, Alexander; "Hopping over Big Data: Accelerating Ad-hoc OLAP Queries with Grasshopper Algorithms" published Feb. 26, 2015, 30 pages.

Dynamic Flow process definition Nov. 26, 2018, google.com, hllps://www.google.com/search?biw=1920&bih=1076&ei=njv8W_CJD4mizwK_l4gCQ&q=%22dynamic+flow+process%22+definition&oq=%22dynamic•flow+process%22+definition&gs l=psy-ab .3 ... 38876 .39886 .. 40199 ... 0 .0 .. 0. 76.437 .8 ...... 0 .... 1 .. gws-.viz Oi71 j0i7i30j0i30j0i8i30.

Dynamic Flow process OLAP Nov. 26, 2018, google.com, https://www.google.com/search?biw=1920&bih=1076&ei=njv8W_CJD4mizwK_l4gCQ&q=%22dynamic+flow+process%22+definition&oq=%22dynamic•flow+process%22+definition&gs l=psy-ab .3 ... 38876 .39886 .. 40199 ... 0 .0 .. 0. 76.437 .8 ...... 0 .... 1 .. gws-.viz Oi71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

Oracle ©, Oracle Enterprise Performance Management System Documentation, Release 11.1.2.4/Essbase, Database Administrator's Guide, Developing Formulas for Block Storage Databases, Copyright © 2019, 28 pages.

Larimer, Mike et al., Oracle, OAC Essbase Hybrid Block Storage Option Performance Tuning, White Paper, Oracle ©, Jun. 11, 2018, 24 pages.

Oracle, Oracle® Cloud, Oracle Cloud Administering Oracle Essbase Cloud, Copyright © 1996, 2016, 632 pages.

Oracle, Oracle® Cloud, Administering Oracle Analytics Cloud—Essbase, Copyright © 1996, 2017, 703 pages.

Essbase Information Development Team, Oracle® Cloud, Technical Reference for Oracle Analytics Cloud—Essbase, E70189-04, Sep. 2017, Copyright © 1996, 2017, 1044 pages.

EPM Information Development Team, Oracle® Essbase Release 11.1.1, Database Administrator's Guide, Copyright © 1996, 2008, 1182 pages.

EPM Information Development Team, Oracle® Essbase, Technical Reference, Release 11.1.2.2.100, Copyright © 1996, 2012, 1402 pages.

EPM Information Development Team, Oracle® Essbase Database Administrator's Guide, Release 11.1.2.2.100, Updated Dec. 2013, Copyright © 1996, 2013, 1138 pages.

Turrell, Jake, "Introduction to Essbase Hybrid Aggregation Mode", Mar. 4, 2015, 12 pages, retreived on Jan. 15, 2020 from: <http://turrellconsulting.com/blog/?s=introduction+to+essbase+hybrid+aggregation+mode&searchsubmit=U>.

Oracle, Oracle® Business Intelligence Cloud Service Data Sync, Getting Started, Release 2.2, Sep. 2016, Copyright © 2010, 2016, 6 pages.

Oracle, Oracle® Business Intelligence Cloud Service Data Sync, Read Me, Release 2.2, Sep. 2016, Copyright © 2016, 6 pages.

Harvey, Rosie et al., Oracle® Cloud, Preparing Data in Oracle Business Intelligence Cloud Service, E64760-07, Feb. 2017, Copyright © 2014, 2017, 282 pages.

Williams, Richard, "Configuring the Data Sync Tool for BI Cloud Service (BICS)", Apr. 24, 2015, 20 pages.

Oracle, Loading Data with Oracle BI Cloud Service Data Sync, Tutorial, Copyright © 2015, 34 pages.

\* cited by examiner

SYSTEM AND METHOD FOR REAL TIME DATA AGGREGATION IN A VIRTUAL CUBE IN A MULTIDIMENSIONAL DATABASE ENVIRONMENT

CLAIM OF PRIORITY

This application claims priority to U.S. Provisional patent application entitled "SYSTEM AND METHOD FOR REAL TIME DATA AGGREGATION IN A VIRTUAL CUBE IN A MULTIDIMENSIONAL DATABASE ENVIRONMENT", Application No. 62/700,762, filed on Jul. 19, 2018, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and data warehousing, and are particularly related to systems and methods for root cause analysis and automatic generation of key metrics in a multidimensional database environment.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein are systems and methods for real time data aggregation in a virtual cube in a multidimensional database, in accordance with an embodiment. A method can provide, at a computer that includes one or more microprocessors, a multidimensional database server executing on the computer, wherein the multidimensional database server supports at least one multidimensional cube, and a data source associated with the multidimensional cube. The method can query, by the multidimensional cube, the data source, the query comprising an identification of at least one source of real-time data accessible the data source. The method can provide, by the data source, on-demand access to the multidimensional cube to the at least one source of real-time data. The method can use targeted data from the at least one source of real-time data within the multidimensional cube without being stored therein.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
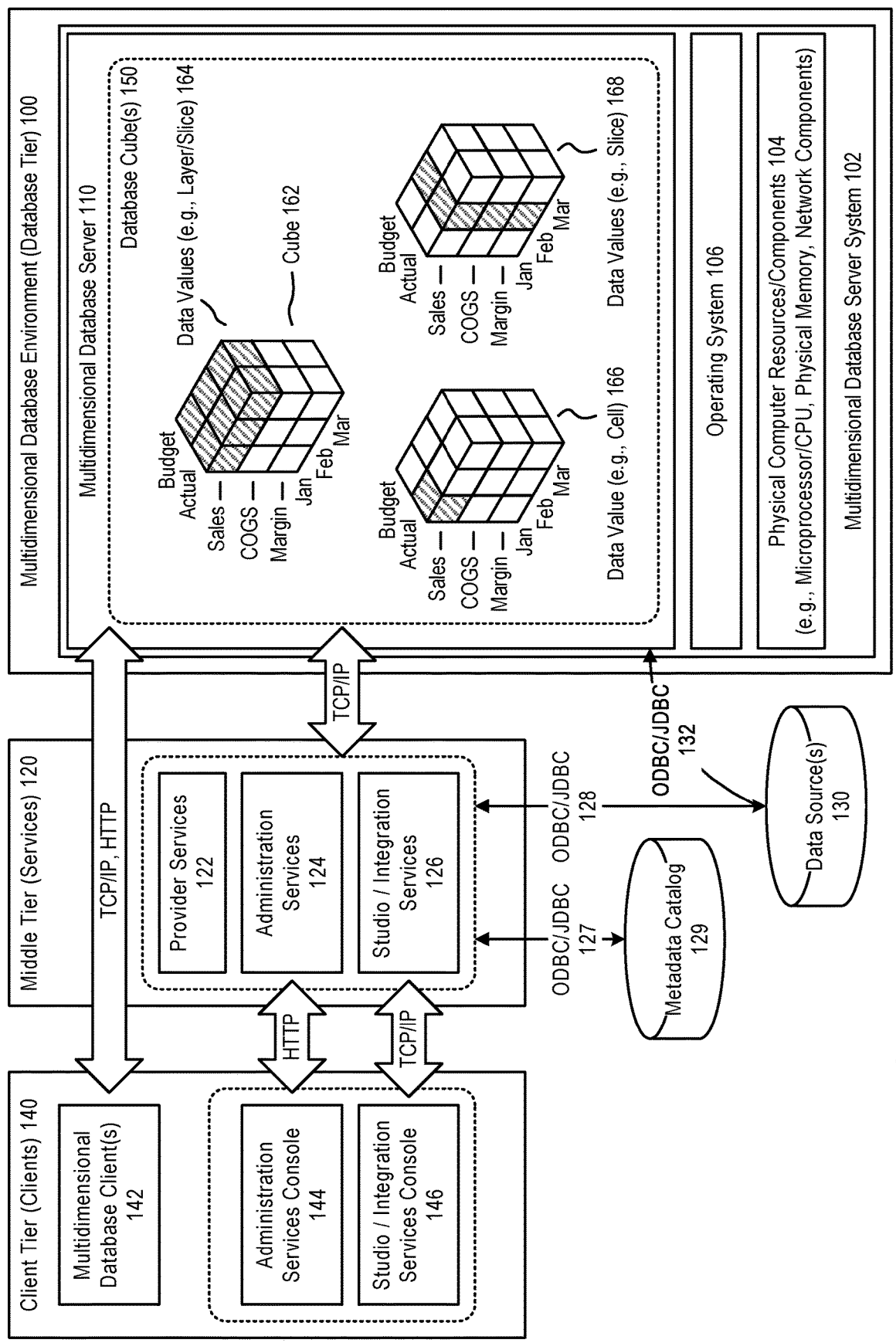
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

In accordance with an embodiment, OLAP systems can organize data in multiple dimensions allows searchers/users of the data set to conduct directed searches that traverse various dimensions to ultimately arrive at the result of interest. OLAP systems can view data as residing at the intersection of dimensions. Put another way, the data underlying OLAP systems can be organized and stored as a multi-dimensional database which is an instantiation of the cross-product of all of the dimensions. This allows users/searchers to traverse hierarchies of detail along dimensions of interest in an ad hoc manner to get at specific, targeted data. Slowly changing data can be represented as metadata within a current data set.

Real Time Data Aggregation in a Virtual Cube

In accordance with an embodiment, in traditional systems, one of the advantages of a multidimensional database cube was that all underlying data (e.g., source data) was loaded into the multidimensional database. This allowed faster analysis as the multidimensional database did not have to retrieve data for each requested analysis, and also provided for faster computation as the data was loaded at the site of the multidimensional database. However, as the trends of big data have continued, loading all source data into a multidimensional database becomes unwieldy and, in some situations, can lead to lessened performance. By supporting real time data aggregation, multidimensional database have the ability to have multiple cubes (distributed) that all refer to the same relational database (e.g., source data). Instead of retrieving data from a loaded source, the multidimensional database can query a source data location, or multiple source data locations, and aggregate the data in real time.

Figure 2:
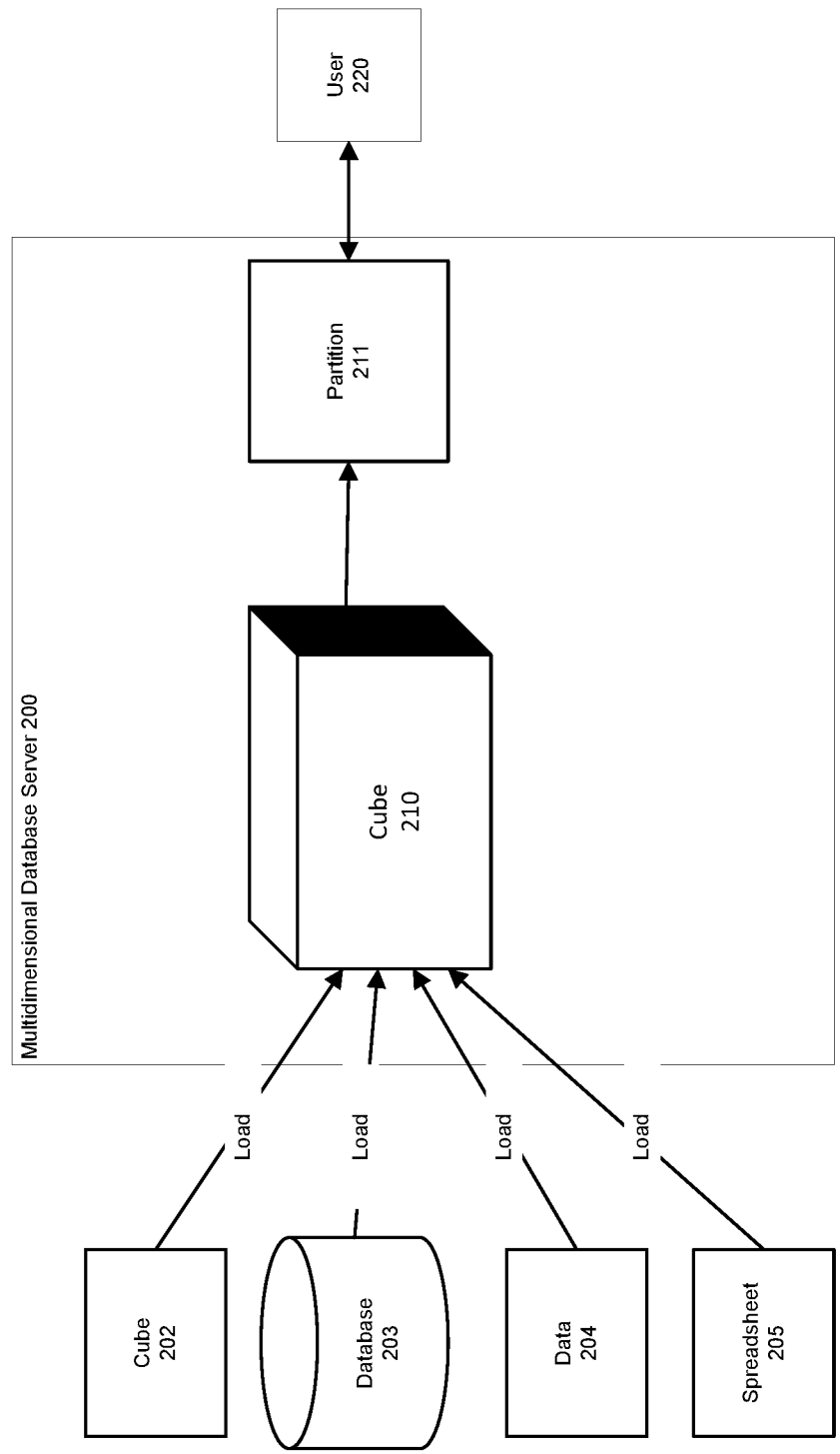
FIG. 2 shows an exemplary multidimensional database environment, in accordance with an embodiment.

FIG. 2 shows an exemplary multidimensional database environment, in accordance with an embodiment.

In accordance with an embodiment, within a multidimensional database server 200, there can be one or more database cubes 210. From each of these cubes, one or more partitions 211 can be generated. A partition can be used to simplify user 220 access to data across multiple cubes. Partitions allow users and administrators to select specific subsets of data and metadata for analysis, using replicated, transparent, or linked partitioning schemes.

In accordance with an embodiment, the cube 210 can be populated with data from a number of external data sources, such as another cube 202, a database 203, data 204 (e.g., in the form of a comma separated variable sheet), and/or a spreadsheet 205. (While only certain sources of external data are shown in the figure, one of ordinary skill in the art would recognize that additional and varied other sources of data can be accessed and loaded into the cube 210). However, all external data, be it from another cube 202, database 203, CSV file 204, or spreadsheet 205, must first be loaded into the cube 210 in traditional systems.

In accordance with an embodiment, the loading of the source data into the multidimensional database server, in traditional systems where the source data is relatively small, can be considered a strength of multidimensional database environments as this allows for both data aggregation and calculation. Calculation and aggregation happens on data that resides within the multidimensional database environment. The data is loaded, aggregated and calculated in its own repository.

Figure 3:
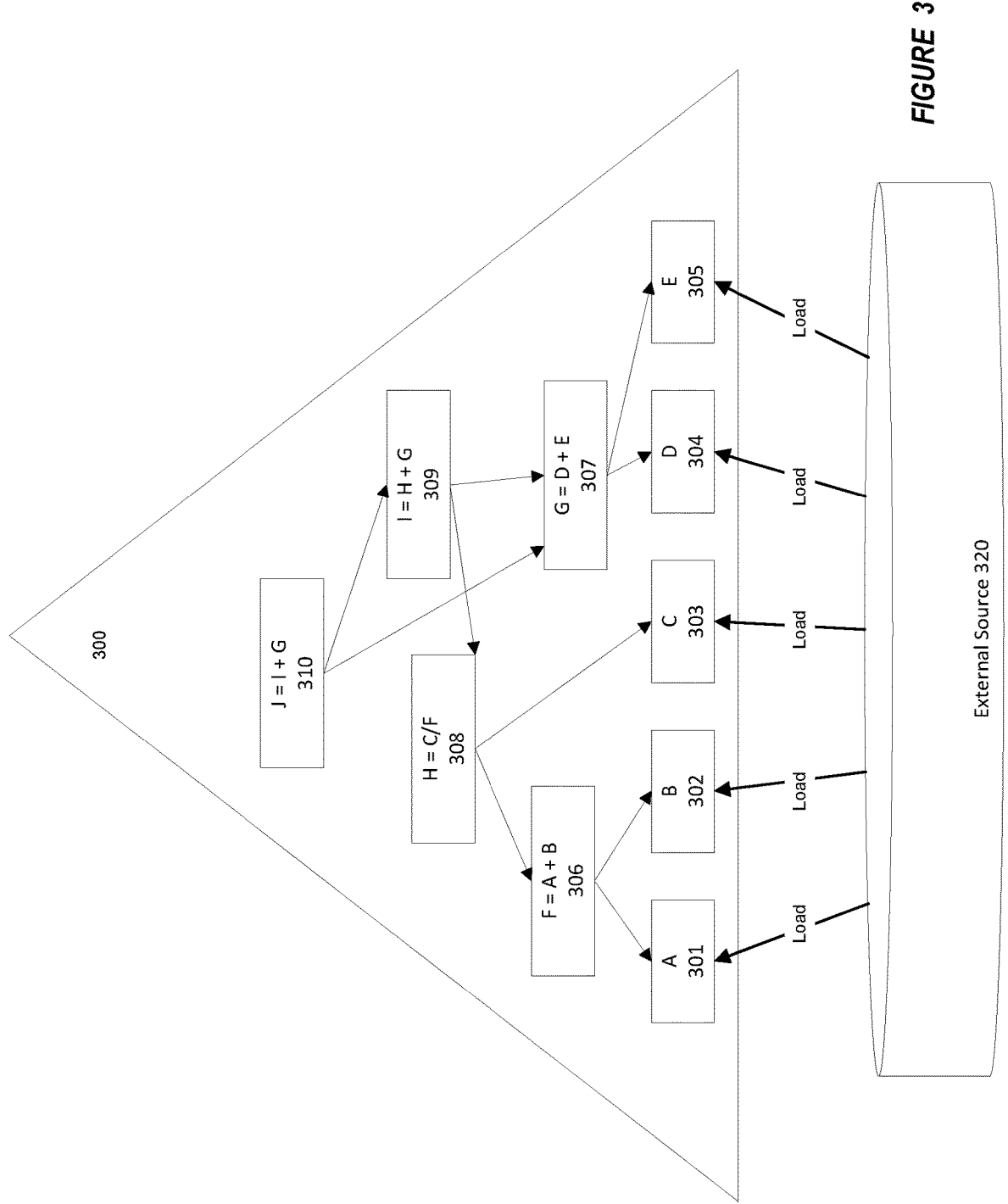
FIG. 3 shows an exemplary embodiment for dynamic calculation, in accordance with an embodiment.

FIG. 3 shows an exemplary embodiment for dynamic calculation, in accordance with an embodiment.

In accordance with an embodiment, FIG. 3 shows an additional advantaged gained when utilizing a multidimensional database environment. This is the idea of dynamic calculation and aggregation with hybrid.

In accordance with an embodiment, a dynamic calculation 300 can comprise a number of loaded values and reduced the size of the databases. Within a dynamic calculation, loaded values A 301, B 302, C 303, D 304, and E 305, which have been loaded from an external source 320 (or more than one external source) into a multidimensional database that is hosting the dynamic calculation 300, can be used to in real time for dynamic calculations. This gives users a real time ability to compute metrics on top of loaded and stored values. These metrics can comprise, for example, F 306, G 307, H 308, I 309, and J 310. However, computations happen on top of stored values (i.e., values that have already been loaded and stored at the cube from external sources). These metrics can additionally be stored within the multidimensional database, further increasing the footprint of the multidimensional database.

In accordance with an embodiment, then based upon dependency analysis, such as that shown in dynamic calculation 300, the size of the data loaded into the cube can be reduced. In this way, less data is stored within the cube as a smaller number of data dimensions need to be loaded into the cube or supplied by the user.

In accordance with an embodiment, dynamic computation on loaded values can reduce the size of a database. In addition, it provides a real time ability to compute metrics on top of loaded and stored values. However, because the computations happen on top of values (e.g., leaf values) that are loaded and stored at the multidimensional database, the overall size of the database can still be quite large as all the values from an external source are loaded and stored, and the dynamic calculations are run on top of these values (but not stored themselves).

Figure 4:
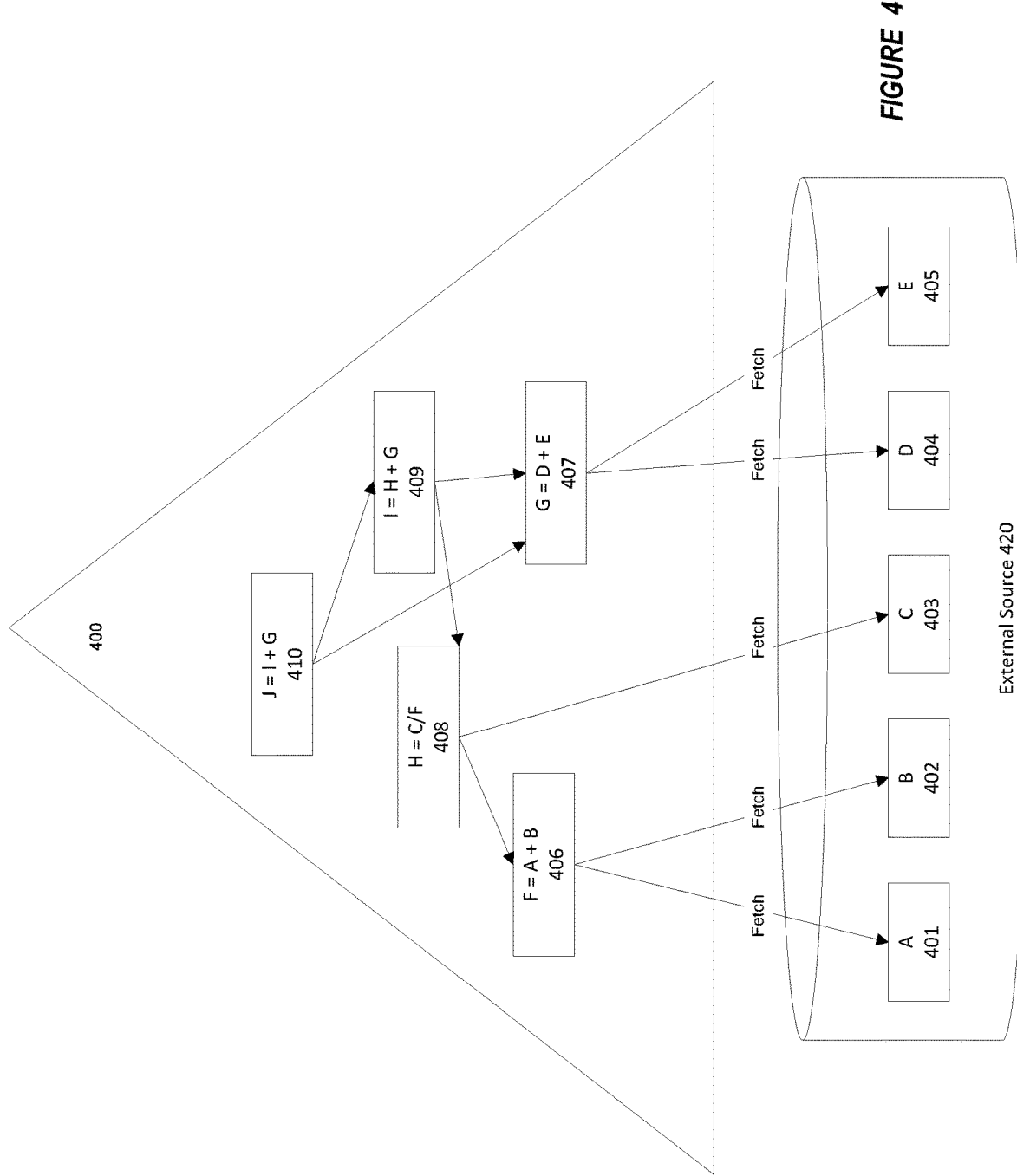
FIG. 4 illustrates dynamic computations on external data in a multidimensional database environment, in accordance with an embodiment.

FIG. 4 illustrates dynamic computations on external data in a multidimensional database environment, in accordance with an embodiment.

In accordance with an embodiment, a dynamic calculation 400 can, instead of relying on stored values, like that shown in FIG. 3, instead reach into (via a database interface, such as a SQL database interface) the external source 420 (or other storage location type) where the values A 401, B 402, C 403, D 404, and E 405, are located, and pull them out on an on-demand basis (dynamically). Such fetch operations can occur, for example, when a dynamic calculation metric is performed. For example, if metric F 406 was desired or called to be executed, then the systems and methods could, on an on-demand basis, fetch values A 401 and B 402 from the external source 420, which would then be used in determining the metric F, which could be used within the dynamic calculation 400. However, the values of A and B would not be stored, and would instead be discarded after use, thus minimizing the storage footprint the dynamic calculation utilizes in the multidimensional database server environment.

In accordance with an embodiment, the values that are pulled from the external source 420 are determined based upon a user query or upon a query from the cube (location of the dynamic computations). In this way, only the data that is requested/targeted is accessed, while other data that may be at that external source is ignored (e.g., not loaded) until a call or request is made that relies upon the data at the source.

In accordance with an embodiment, in such a way, where all values within the cube are dynamically calculated, and all data is pulled directly from the data source, then the cube has zero footprint—all data comes directly from a table in real time, and any dynamic calculations are run on top of these values that are not loaded and stored. Such systems and methods, in addition to having zero footprint (no values are loaded and stored), also provide the benefits of high availability, and zero-downtime backup and patching.

In accordance with an embodiment, when values are fetched from an external source, the values are not stored or cached at the multidimensional database server. Instead, the values are used directly in the cube (e.g., for dynamic calculations).

In accordance with other embodiments, systems and methods can supporting the caching of values fetched from external sources. This can be done, for example, on timed intervals. In such situations, as an example, data that is fetched in real time can be saved to/overwrite data cached at the multidimensional database environment, at a configured time interval. This can be done, for example, when it is desirable to have a cached backup, or to see historical trends. In such situations, a multidimensional database cube can still be said to have zero footprint because if the multidimensional database cube crashes or becomes corrupt, any and all cached data can be purged, and a new multidimensional database cube can be configured to start a new cache without referring to the prior multidimensional database cube.

Figure 5:
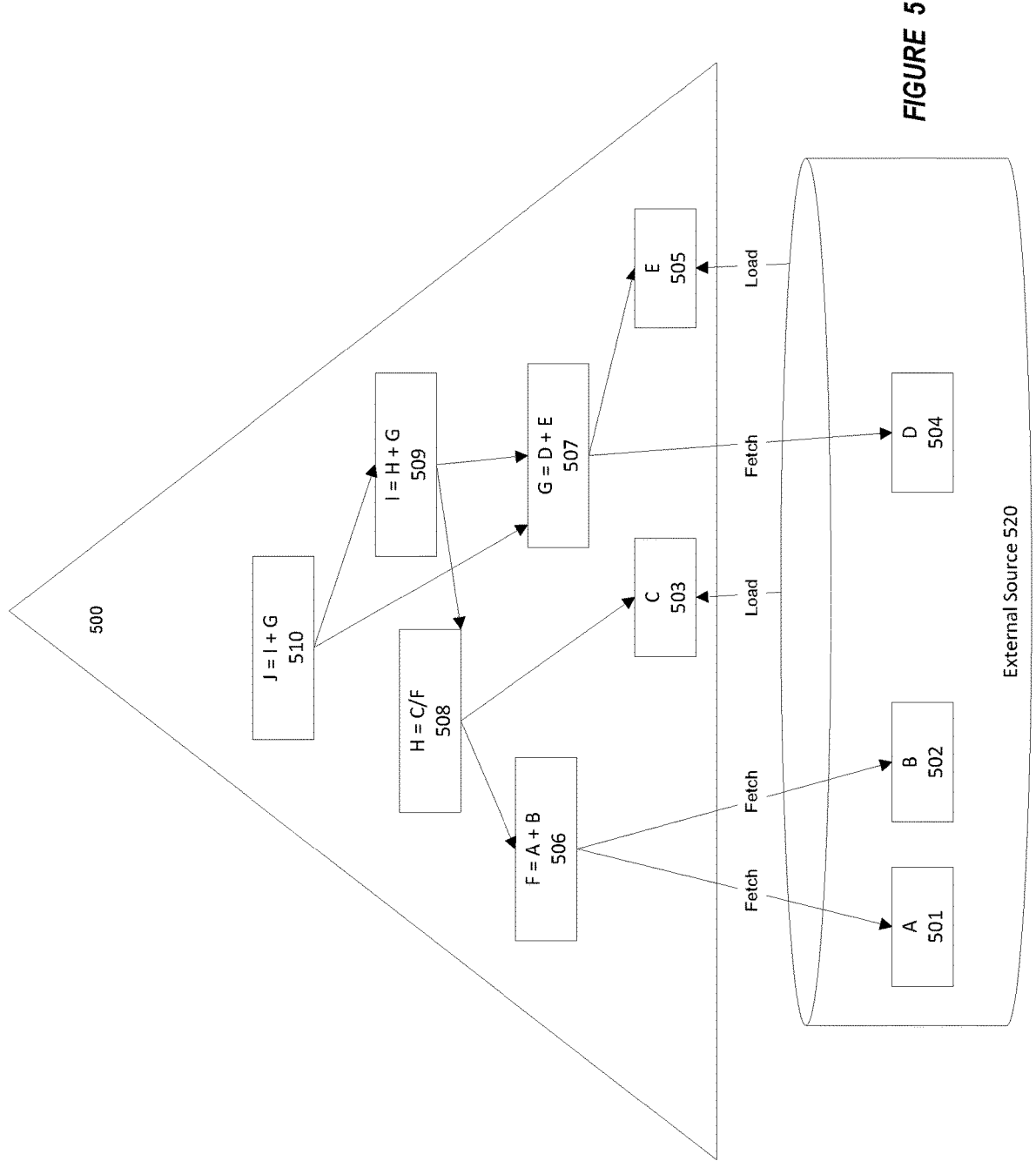
FIG. 5 illustrates dynamic computations on external data in a multidimensional database environment, in accordance with an embodiment.

FIG. 5 illustrates dynamic computations on external data in a multidimensional database environment, in accordance with an embodiment.

In accordance with an embodiment, a dynamic calculation 500 can, instead of relying only on stored values, like that shown in FIG. 3, and instead of only relying on fetching values from an external source 520, utilize a hybrid approach where values that are used frequently, such as values C 503 and E 505, are loaded, while other values used less frequently, such as A 501, B 502, and D 504, remain at the external source, and are reached via fetch operations (e.g., via a database interface, such as a SQL database interface) at the external source 520 (or other storage location type). This hybrid approach allows certain values to be loaded while others are pulled from an external source on an on-demand basis (dynamically). Such fetch operations can occur, for example, when a dynamic calculation metric is performed. For example, if metric G 507 was desired or called to be executed, then the systems and methods could, on an on-demand basis, fetch value D 504 from the external source and utilize value E 505 from local storage, to be used in determining the metric G, which could be used within the dynamic calculation 500. However, the value of D would not be stored, and would instead be discarded after use, thus reducing the storage footprint the dynamic calculation utilizes in the multidimensional database server environment.

In accordance with an embodiment, the values that are pulled from the external source 520 are determined based upon a user query or upon a query from the cube (location of the dynamic computations). In this way, only the data that is requested/targeted is accessed, while other data that may be at that external source is ignored (e.g., not loaded) until a call or request is made that relies upon the data at the source.

In accordance with an embodiment, in such a way, where all values within the cube are dynamically calculated, some values are stored, and some are pulled directly from the data source, then the cube has a reduced footprint than if all data was stored. In addition, by actively and automatically selecting which values are loaded and stored, and which values are kept only at a source, the performance of the multidimensional database can be improved by reducing size for those values that are not loaded and stored, and also keeping the same performance levels for those values that are loaded and stored.

Figure 6:
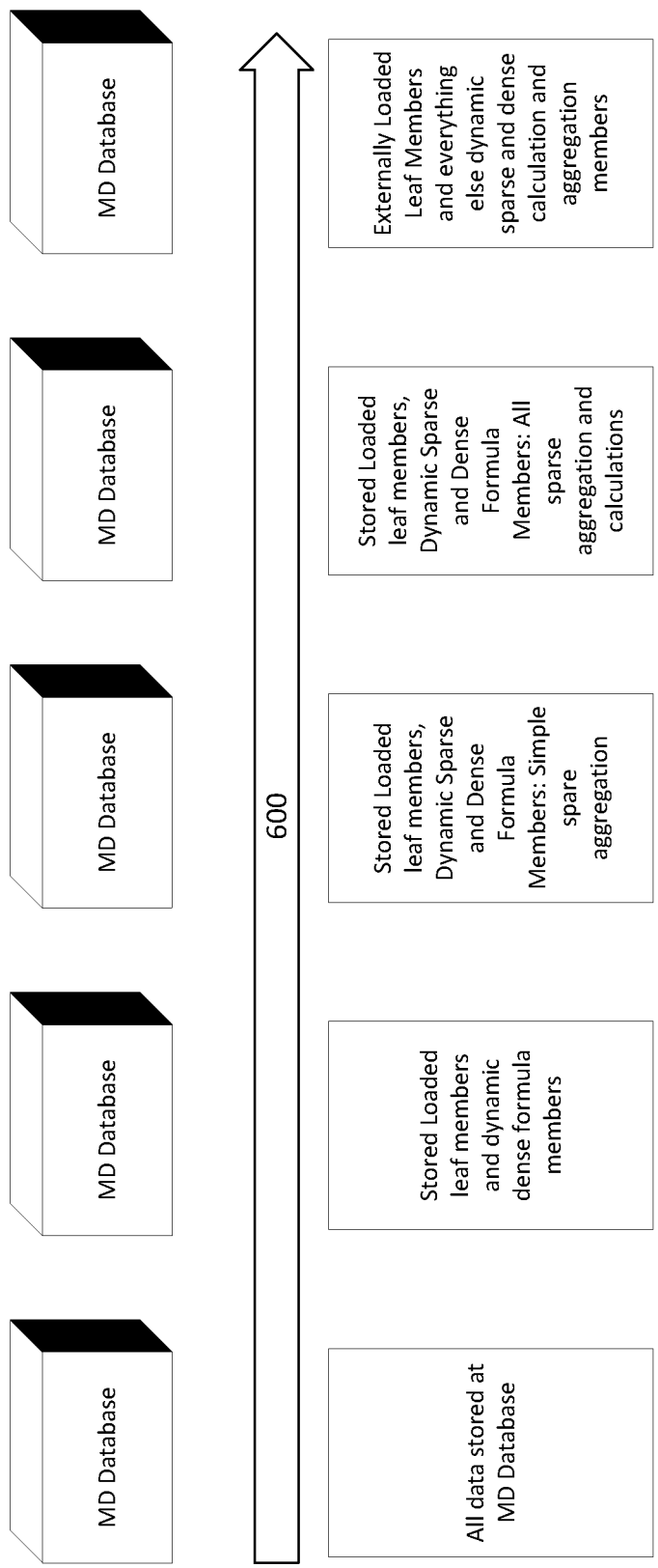
FIG. 6 illustrates a dynamic calculation continuum, in accordance with an embodiment.

FIG. 6 illustrates a dynamic calculation continuum, in accordance with an embodiment.

In accordance with an embodiment, within the dynamic calculation continuum 600, on one side (left side), there exists cubes where all data is loaded and stored within the multidimensional database cube. This is desirable when the data is relatively small and does not undergo frequent changes or updates (e.g., where users need to refresh their data once a day). On the other side of the continuum (far right side), there exists cubes where all data is externally loaded leaf data. These situations are desirable in organizations where there are large amounts of leaf data, or when the source data changes multiple times a day, or is constantly refreshed (e.g., when users need to see the impact of dynamically changed data, such as currency data).

In accordance with an embodiment, when all data is externally loaded, then the multidimensional database cube does not need to worry about disaster recovery. If a cube crashes and loses all dynamic calculations, the external data sources are unaffected and the cube can be restarted with the values pulled from the external data sources.

In accordance with an embodiment, there exists combinations of these two extremes. For example, a user can request that every configurable time period, the cube reaches out and pulls data from the external source and caches the data. However, because the data is cached (and thrown away after use), the footprint of the data cube is still minimized as the values are not stored.

Figure 7:
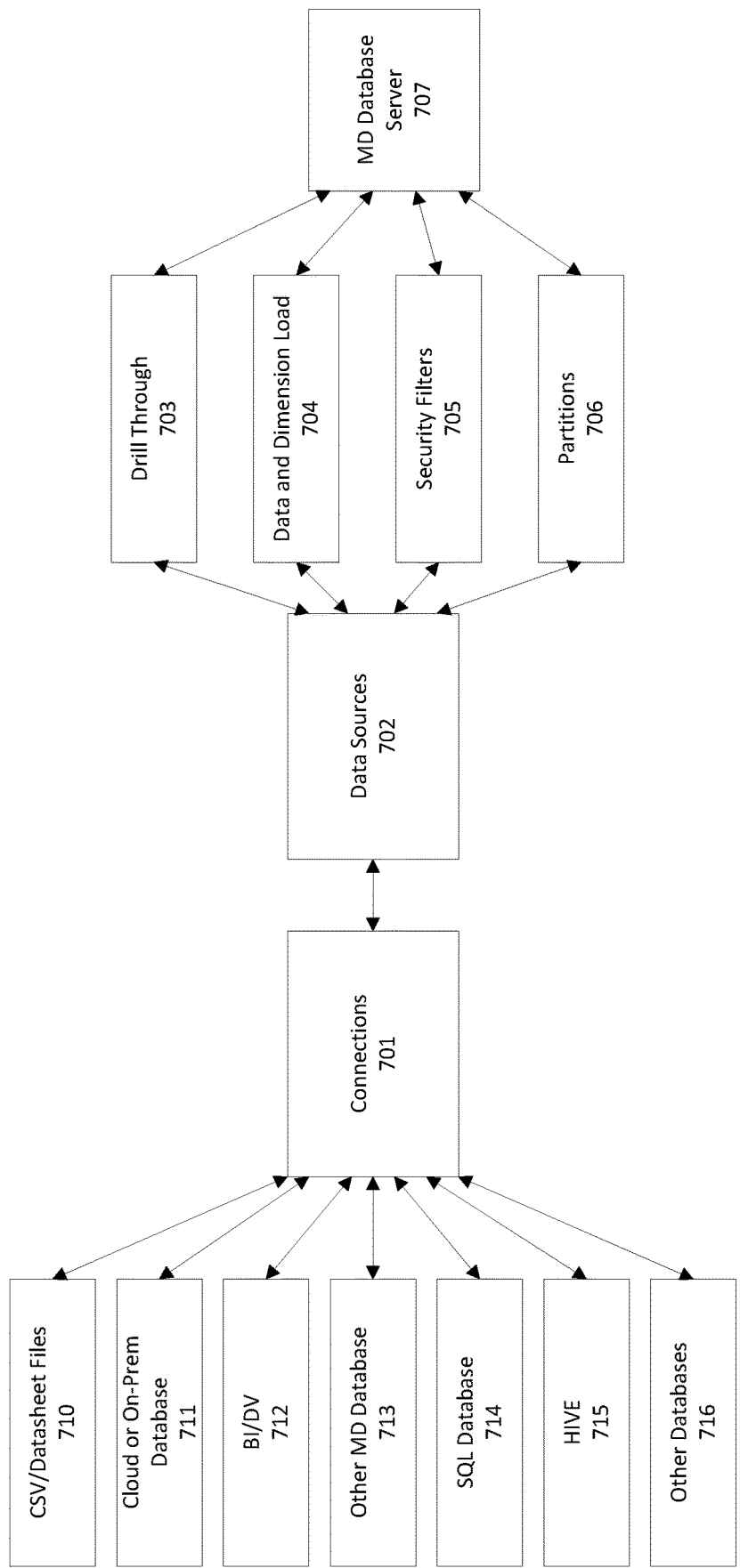
FIG. 7 illustrates a system for real time data aggregation in a virtual cube, in accordance with an embodiment.

FIG. 7 illustrates a system for real time data aggregation in a virtual cube, in accordance with an embodiment.

In accordance with an embodiment, a multidimensional database server 707 (e.g., Essbase Server). The multidimensional database server 707 provides a number of services, such as drill through 703, data and dimension load 704, security filters 705, and partitions 706. Such services can be provided against a data source 702, which can be an abstract table representation based off of/deployed on top of a connection 701.

In accordance with an embodiment, for example a connection 701 can be defined to an external data source (e.g., CSV file 710, a database 711 (e.g., cloud or on-premise), a Business Intelligence or Data Visualization source 712, another multidimensional database cube 713 (e.g., Essbase), a SQL database 714, HIVE 715, or other databases (such as a SQL server, DB2, Teradata) 716). The connection can comprise, for example, an Essbase connection, a file connection, a JDBC connection, a physical connection, or any other type of connection that can work with and communicate with the selected external data source. On top of this connection, a data source 702 can be defined. The data source, for example, can comprise a data structure based upon the selected external data source. For example, if an Excel sheet was the selected external data source, then on top of a file connection, a data source could define a data structure comprise a number of columns, rows, tabs, and parameters of the Excel sheet. This then defines the data source which the multidimensional database server can act upon via the services. As well, multiple data sources can be defined against one connection.

In accordance with an embodiment, then, the multidimensional database server can utilize, for example, a partition service against the data source, where the partition service, as described above, can allow users and administrators to select specific subsets of data and metadata from the data source for analysis, using replicated, transparent, or linked partitioning schemes.

In accordance with an embodiment, the multidimensional database server can also utilize, for example, the data dimension and load service to load selected data to the multidimensional database server (e.g., as shown in FIG. 3 above).

In accordance with an embodiment, the multidimensional database server can also utilize, for example, the drill through service to dynamically fetch selected data in real time so as to minimize the footprint of the multidimensional database server (e.g., as shown in FIG. 4 above).

In accordance with an embodiment, the multidimensional database server can also utilize multiple services in conjunction with each other. For example, the multidimensional database server could utilize a partition service, as well as the data dimension and load service and the drill through service against one data source. This would allow, for example, some data to be loaded and stored, other data to be dynamically fetched, and only for those data dimensions applicable to the configured partition.

In accordance with an embodiment, the connection can be any number of external data sources, such as a CSV file 710, a database 711 (e.g., cloud or on-premise), a Business Intelligence or Data Visualization source 712, another multidimensional database cube 713 (e.g., Essbase), a SQL database 714, HIVE 715, or other databases (such as a SQL server, DB2, Teradata) 716.

In accordance with an embodiment, in this way, this allows the cube 707 to drill through the data source directly to the connection, which can be any number of repositories of data. Then, the requested/targeted data can be pulled, in real time, into the cube 707, which can then use the data in dynamic calculations, all without storing the real time data within the cube 707.

Real Time Data-Aggregation in a Virtual Cube on Top of Big Data

In accordance with an embodiment, more and more external data is being compiled in the context of "big data" (e.g., petabytes of information). In order to perform real time data-aggregation in a virtual cube on top of a big data cluster, source aggregation agents can be deployed inside of the big data clusters. Real time and partitioned multidimensional database cubes can then be started for the aggregation clients in the big data cluster (e.g., one cube per aggregation agent, one cube for multiple aggregation clients, or multiple cubes for one aggregation client, all depending on the requirements of the system).

In accordance with an embodiment, then, a transparent partition can reside on top of the real time and partitioned multidimensional database cubes. This can allow for scale by distributing queries, source aggregation, and dynamic computation and real time access to the source data (i.e., no loading and storing the source data).

Figure 8:
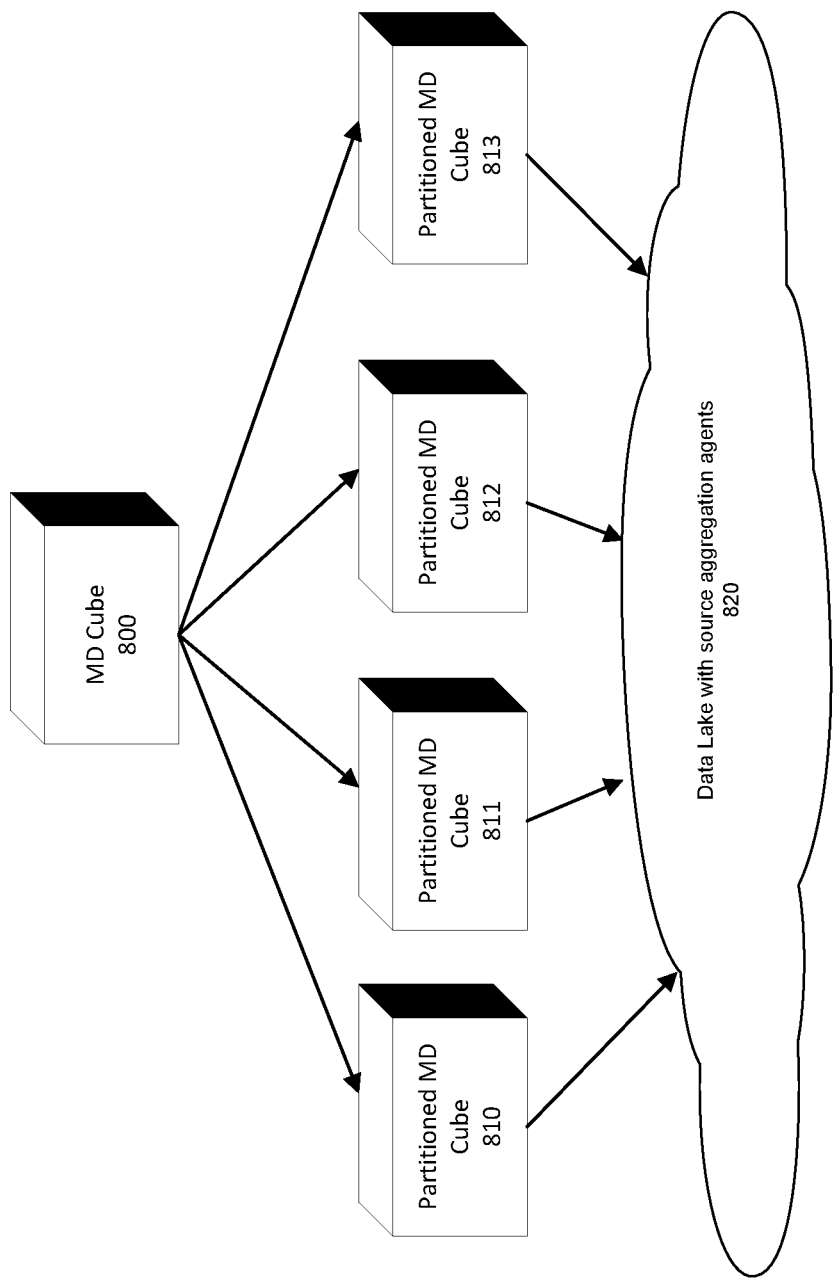
FIG. 8 illustrates a system for real time data aggregation in a virtual cube, in accordance with an embodiment.

FIG. 8 illustrates a system for real time data aggregation in a virtual cube, in accordance with an embodiment.

In accordance with an embodiment, source aggregation agents (not shown) can be deployed in big data clusters 820. The source aggregation clients can, for example, exponentially reduce the size of the source data (e.g., from petabytes to terabytes or gigabytes). Real time and partitioned multidimensional cubes 810, 811, 812, 813 for aggregation on top of aggregated-big-data can sit at level above the source data with aggregation agents, where each real time and partitioned multidimensional cube further reduces the size of the data each cube is responsible for dynamically fetching data from either the big data source or one or more of the source aggregation agents. One or more transparent partitions 800 can sit on top of real-time cubes 810, 811, 812, 813. In this way, the systems and methods can achieve scale by distributing queries, source aggregation, dynamic computation, and real time access to source data.

In accordance with an embodiment, the data lake with source aggregation agents can extremely shrink the size of a big data set. Then, real time and partitioned multidimensional database cubes 810, 811, 812, and 813 can sit on top of the aggregated data, access the data in real time (as described above), and further shrink the data to a more manageable size. Each of these partitioned multidimensional database cubes can be associated with one or more attributes, such as a geographic attribute. For example, where the big data set with aggregators can comprise data from all parts of the world, each cube 810, 811, 812, 813 could, for example, dynamically fetch only data associated with its assigned geographic scope (e.g., North America, South America, Africa, Europe . . . etc.).

In accordance with an embodiment, once the data is cached/calculated at the partitioned cubes 810, 811, 812, 813, another partitioned multidimensional database cube (e.g., a transparent partition) 800 can access, in real time, the data from the partitioned cubes 810, 811, 812, 813, as described above.

In accordance with an embodiment, in this way, data from a big data source can be dynamically pulled into a cube 700 where a user can manipulate and make desired calculations in a much more efficient manner.

In accordance with an embodiment, there are a number of benefits that arise from real time data aggregation in a virtual cube. For example, such systems and methods provide real-time access to table data in formulas and aggregation. As well, updates to source data take effect immediately, which is important in modeling "volatile" data drivers (e.g., currency) that help users achieve constrained and viable plans.

As mentioned above, in an embodiment, real time data aggregation in a virtual cube also provides for zero footprint. This in turn obviates the need for backups, and also provides for zero-downtime patching. High availability is also provided as multiple cubes can be driver by the same tabular data.

In accordance with an embodiment, real time data aggregation in a virtual cube provides for active-active and scale out of a same cube to multiple geographical locations and data centers. This allows scale to a large number of users, a reduction in latency to such users. Restructuring is also faster because almost all the time in restructuring is currently spent on data re-shaping. This avoids that as there is no stored data to be re-shaped. As well, because of the calculation continuum described above, users can select which data aggregation and storage model is right for them, allowing for improved personalization.

Figure 9:
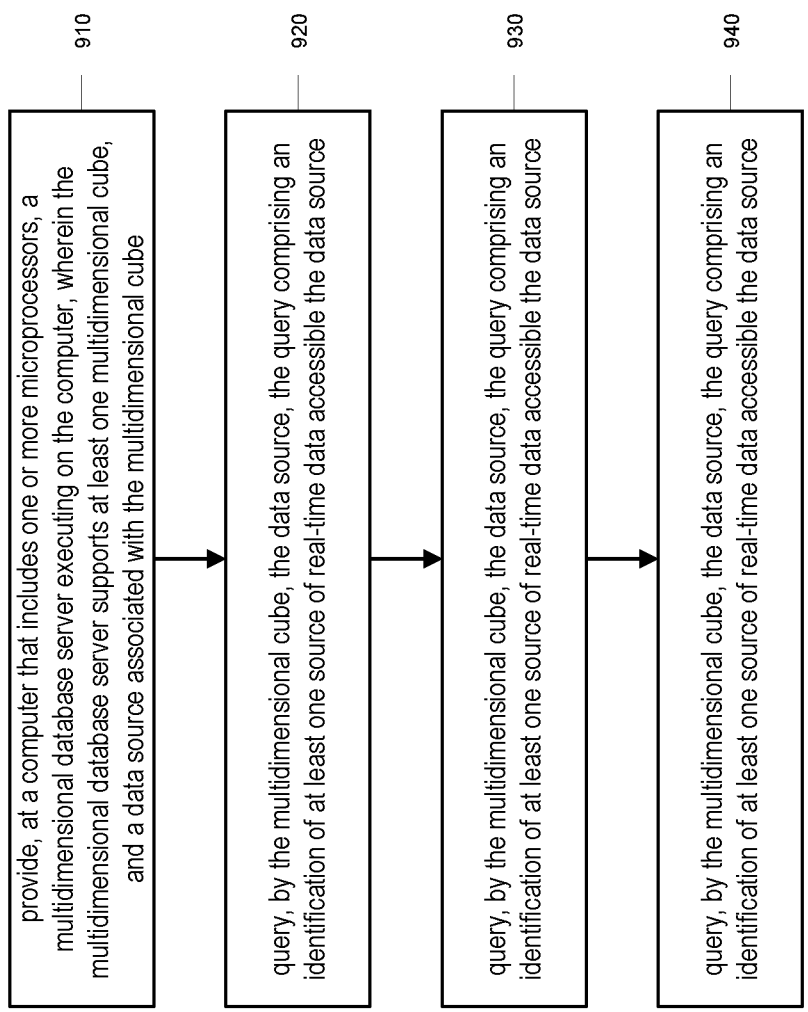
FIG. 9 is a flowchart of a method for method for real time data aggregation in a virtual cube in a multidimensional database.

FIG. 9 is a flowchart of a method for method for real time data aggregation in a virtual cube in a multidimensional database.

At step 910, the method can provide, at a computer that includes one or more microprocessors, a multidimensional database server executing on the computer, wherein the multidimensional database server supports at least one multidimensional cube, and a data source associated with the multidimensional cube.

At step 920, the method can query, by the multidimensional cube, the data source, the query comprising an identification of at least one source of real-time data accessible the data source.

At step 930, the method can query, by the multidimensional cube, the data source, the query comprising an identification of at least one source of real-time data accessible the data source.

At step 940, the method can query, by the multidimensional cube, the data source, the query comprising an identification of at least one source of real-time data accessible the data source.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for real time data aggregation in a virtual cube in a multidimensional database, comprising:
    a computer that includes one or more microprocessors;
    a multidimensional database server executing on the computer;
    a multidimensional database stored on the multidimensional database sever;
    a plurality of real-time data cubes of the multidimensional database wherein each of the plurality of real-time data cubes is associated with a data attribute;
    a transparent partition of the multidimensional database, wherein the transparent partition resides on top of said plurality of real-time data cubes;
    a provider service of the multidimensional database sever wherein the provider service provides a data source comprising a plurality of connections to a database comprising a source of real-time data external to the multidimensional database, wherein the source of real-time data comprises a big data source comprising a plurality of source data aggregation clients, and wherein the data source provides on-demand access to the multidimensional cube to at least one of the plurality of source data aggregation clients;
    wherein, in response to a query directed at the multidimensional database, each of said plurality of real-time data cubes is configured to query the data source, the query comprising an identification of the source of real-time data external to the multidimensional database;
    wherein the data source provides each of said plurality of real-time data cubes with on-demand access via said plurality of connections to the database comprising the source of real-time data external to the multidimensional database.

2. The system of claim 1, wherein targeted data from the at least one source of real-time data is fetched, by the data source, upon execution of the query.

3. The system of claim 2, wherein the targeted data, upon being fetched by the data source, is utilized by the multidimensional database for one or more dynamic computations.

4. The system of claim 3, wherein the one or more dynamic computations are based upon the query.

5. The system of claim 4, the transparent partition resides on top of said plurality of real-time data cubes and one or more multidimensional database cubes.

6. The system of claim 1, wherein:
    each of the plurality of source data aggregation clients is associated with a separate one of the plurality of real-time data cubes of the multidimensional database.

7. The system of claim 1, wherein:
    the plurality of source data aggregation clients is deployed inside a big data cluster of the big data source.

8. A method for real time data aggregation in a virtual cube in a multidimensional database, comprising:
    providing a computer that includes one or more microprocessors;
    operating a multidimensional database server on the computer;
    storing a multidimensional database on the multidimensional database sever;
    creating a plurality of real-time data cubes of the multidimensional database on the multidimensional database server, wherein each of the plurality of real-time data cubes is associated with a data attribute;
    creating a transparent partition of the multidimensional database on the multidimensional database server, wherein the transparent partition resides on top of said plurality of real-time data cubes;
    operating a provider service of the multidimensional database sever to provide a data source comprising a plurality of connections to a database comprising a source of real-time data external to the multidimensional database;
    receiving a query directed at the multidimensional database;
    querying the data source with said plurality of real-time data cubes, the query comprising an identification of the source of real-time data external to the multidimensional database;
    providing each of said plurality of real-time data cubes with on-demand access via said plurality of connections to the database comprising the source of real-time data external to the multidimensional database; and
    using targeted data from the source of real-time data within the multidimensional database without being stored therein.

9. The method of claim 8, wherein targeted data from the source of real-time data is fetched, by the data source, upon execution of the query.

10. The system of claim 9, wherein the targeted data, upon being fetched by the data source, is utilized by the multidimensional database for one or more dynamic computations.

11. The system of claim 10, wherein the one or more dynamic computations are based upon the query.

12. The system of claim 11, wherein the transparent partition resides on top of said plurality of real-time data cubes and one or more multidimensional database cubes.

13. The system of claim 8, wherein:
each of the plurality of source data aggregation clients is associated with a separate one of the plurality of real-time data cubes of the multidimensional database.

14. The system of claim 13,
wherein the big data source comprises a plurality of source data aggregators, and
wherein the data source provides on-demand access to the multidimensional database to the at least one of the plurality of source data aggregators.

15. A non-transitory computer readable storage medium having for real time data aggregation in a virtual cube in a multidimensional database operating on a computer that includes one or more microprocessors, which instructions, when read and executed cause the computer to perform steps comprising:
operating a multidimensional database server on the computer;
storing a multidimensional database on the multidimensional database sever;
creating a plurality of real-time data cubes of the multidimensional database on the multidimensional database server, wherein each of the plurality of real-time data cubes is associated with a data attribute;
creating a transparent partition of the multidimensional database on the multidimensional database server, wherein the transparent partition resides on top of said plurality of real-time data cubes;
operating a provider service of the multidimensional database sever to provide a data source comprising a plurality of connections to a database comprising a source of real-time data external to the multidimensional database;
receiving a query directed at the multidimensional database;
querying the data source with said plurality of real-time data cubes, the query comprising an identification of the source of real-time data external to the multidimensional database;
providing each of said plurality of real-time data cubes with on-demand access via said plurality of connections to the database comprising the source of real-time data external to the multidimensional database; and
using targeted data from the source of real-time data within the multidimensional database without being stored therein.

16. The non-transitory computer readable storage medium of claim 15,
wherein targeted data from the source of real-time data is fetched, by the data source associated with the multidimensional database, upon execution of the query.

17. The non-transitory computer readable storage medium of claim 16
wherein the targeted data, upon being fetched by the data source, is utilized by the multidimensional database for one or more dynamic computations.

18. The non-transitory computer readable storage medium of claim 17, wherein the one or more dynamic computations are based upon the query.

19. The non-transitory computer readable storage medium of claim 18, wherein the transparent partition resides on top of said plurality of real-time data cubes and one or more multidimensional database cubes.

20. The non-transitory computer readable storage medium of claim 18,
wherein the source of real-time data accessible by the data source comprises a big data source;
wherein the big data source comprises a plurality of source data aggregators, and
wherein the data source provides on-demand access to the multidimensional database to the at least one of the plurality of source data aggregators.

* * * * *